US008114210B2

(12) United States Patent
Hampson et al.

(10) Patent No.: US 8,114,210 B2
(45) Date of Patent: Feb. 14, 2012

(54) BINDERS

(76) Inventors: Carl Hampson, St. Helens (GB); Gert Mueller, Shelbyville, IN (US); Charles Appley, Shelbyville, IN (US)

( * ) Notice: Subject to any disclaimer, the term of this patent is extended or adjusted under 35 U.S.C. 154(b) by 0 days.

(21) Appl. No.: 12/599,858

(22) PCT Filed: Aug. 1, 2008

(86) PCT No.: PCT/EP2008/060185
§ 371 (c)(1),
(2), (4) Date: Mar. 30, 2010

(87) PCT Pub. No.: WO2009/019235
PCT Pub. Date: Feb. 12, 2009

(65) Prior Publication Data
US 2010/0301256 A1 Dec. 2, 2010

(30) Foreign Application Priority Data

Aug. 3, 2007 (GB) .................................. 0715100.4
Apr. 29, 2008 (GB) .................................. 0807777.8
Jun. 6, 2008 (GB) .................................. 0810297.2

(51) Int. Cl.
*C07H 99/00* (2006.01)
(52) U.S. Cl. .................................. 106/217.6; 106/217.9
(58) Field of Classification Search ............... 106/217.6, 106/217.9
See application file for complete search history.

(56) References Cited

U.S. PATENT DOCUMENTS

| | | | |
|---|---|---|---|
| 1,801,052 A | 4/1931 | Meigs | |
| 1,801,053 A | 4/1931 | Meigs | |
| 1,886,353 A | 11/1932 | Novotny et al. | |
| 2,392,105 A | 1/1946 | Sussman | |
| 3,232,821 A | 2/1966 | Moore et al. | |
| 3,297,419 A | 1/1967 | Eyre | |
| 3,791,807 A | 2/1974 | Etzel et al. | |
| 3,802,897 A | 4/1974 | Voigt et al. | |
| 3,809,664 A | 5/1974 | Fanta et al. | |
| 3,826,767 A | 7/1974 | Hoover et al. | |
| 3,856,606 A | 12/1974 | Fan et al. | |
| 3,867,119 A | 2/1975 | Kasuga et al. | |
| 3,911,048 A | 10/1975 | Vargiu et al. | |
| 4,014,726 A | 3/1977 | Fargo | |
| 4,028,290 A | 6/1977 | Reid | |
| 4,048,127 A | 9/1977 | Gibbons et al. | |
| 4,054,713 A | 10/1977 | Sakaguchi et al. | |
| 4,097,427 A | 6/1978 | Aitken et al. | |
| 4,107,379 A | 8/1978 | Stofko | |
| 4,148,765 A | 4/1979 | Nelson | |
| 4,183,997 A | 1/1980 | Stofko | |
| 4,233,432 A | 11/1980 | Curtis, Jr. | |
| 4,246,367 A | 1/1981 | Curtis, Jr. | |
| 4,278,573 A | 7/1981 | Tessler | |
| 4,296,173 A | 10/1981 | Fahey | |
| 4,301,310 A | 11/1981 | Wagner | |
| 4,322,523 A | 3/1982 | Wagner | |
| 4,330,443 A | 5/1982 | Rankin | |
| 4,357,194 A | 11/1982 | Stofko | |
| 4,400,496 A | 8/1983 | Butler et al. | |
| 4,464,523 A | 8/1984 | Neigel et al. | |
| 4,524,164 A | 6/1985 | Viswanathan et al. | |
| 4,668,716 A | 5/1987 | Pepe et al. | |
| 4,692,478 A | 9/1987 | Viswanathan et al. | |
| 4,754,056 A | 6/1988 | Ansel et al. | |
| 4,845,162 A | 7/1989 | Schmitt et al. | |
| 4,906,237 A | 3/1990 | Johansson et al. | |
| 4,912,147 A | 3/1990 | Pfoehler et al. | |
| 4,923,980 A | 5/1990 | Blomberg | |
| 5,037,930 A | 8/1991 | Shih | |
| 5,041,595 A | 8/1991 | Yang et al. | |
| 5,095,054 A | 3/1992 | Lay et al. | |
| 5,106,615 A | 4/1992 | Dikstein | |
| 5,114,004 A | 5/1992 | Isono et al. | |
| 5,124,369 A | 6/1992 | Vandichel et al. | |
| 5,151,465 A | 9/1992 | Le-Khac | |
| 5,308,896 A | 5/1994 | Hansen et al. | |
| 5,318,990 A | 6/1994 | Strauss | |
| 5,336,753 A | 8/1994 | Jung et al. | |
| 5,336,755 A | 8/1994 | Pape | |
| 5,340,868 A | 8/1994 | Strauss et al. | |
| 5,371,194 A | 12/1994 | Ferretti | |
| 5,387,665 A | 2/1995 | Misawa et al. | |
| 5,393,849 A | 2/1995 | Srinivasan et al. | |
| 5,434,233 A | 7/1995 | Kiely et al. | |
| 5,480,973 A | 1/1996 | Goodlad et al. | |
| 5,498,662 A | 3/1996 | Tanaka et al. | |
| 5,536,766 A | 7/1996 | Seyffer et al. | |
| 5,547,541 A | 8/1996 | Hansen et al. | |
| 5,571,618 A | 11/1996 | Hansen et al. | |
| 5,578,678 A | 11/1996 | Hartmann et al. | |

(Continued)

FOREIGN PATENT DOCUMENTS

EP 0044614 A2 6/1981

(Continued)

OTHER PUBLICATIONS

Ames, J. M., "The Maillard Browning Reaction—an Update", Chemistry & Industry, No. 17, 1988, 4 pages.

"Gamma-aminopropyltrimethoxysilane", Hawley's Condensed Chemical Dictionary, 14$^{th}$ Edition, John Wiley & Sons, Inc., 2002, 1 page.

English Translation of Japanese Abstract for 58011193, Jan. 21, 1983, 1 page.

English Translation of Japanese Abstract for 03173680, Jul. 26, 1991, 1 page.

English Translation of Japanese Abstract for 07034023, Feb. 3, 1995, 1 page.

English Translation of Russian Abstract for 374400, Mar. 20, 1973, 1 page.

English Translation of Japanese Abstract for 2004-60058, Feb. 26, 2004, 1 page.

(Continued)

*Primary Examiner* — David M Brunsman
(74) *Attorney, Agent, or Firm* — Barnes & Thornburg LLP

(57) ABSTRACT

An un-reacted substantially formaldehyde free curable binder solution for binding loose matter consists essentially of a solution obtainable by dissolving a reducing sugar, an ammonium salt acid precursor optionally a carboxylic acid or a precursor thereof and optionally ammonia in water.

17 Claims, 1 Drawing Sheet

U.S. PATENT DOCUMENTS

| | | | |
|---|---|---|---|
| 5,582,682 A | 12/1996 | Ferretti |
| 5,583,193 A | 12/1996 | Aravindakshan et al. |
| 5,609,727 A | 3/1997 | Hansen et al. |
| 5,614,570 A | 3/1997 | Hansen et al. |
| 5,620,940 A | 4/1997 | Birbara et al. |
| 5,621,026 A | 4/1997 | Tanaka et al. |
| 5,633,298 A | 5/1997 | Arfaei et al. |
| 5,643,978 A | 7/1997 | Darwin et al. |
| 5,645,756 A | 7/1997 | Dubin et al. |
| 5,661,213 A | 8/1997 | Arkens et al. |
| 5,690,715 A | 11/1997 | Schiwek |
| 5,691,060 A | 11/1997 | Levy |
| 5,693,411 A | 12/1997 | Hansen et al. |
| 5,756,580 A | 5/1998 | Natori et al. |
| 5,788,243 A | 8/1998 | Harshaw et al. |
| 5,855,987 A | 1/1999 | Margel et al. |
| 5,885,337 A | 3/1999 | Nohr et al. |
| 5,895,804 A | 4/1999 | Lee et al. |
| 5,919,831 A | 7/1999 | Philipp |
| 5,925,722 A | 7/1999 | Exner et al. |
| 5,929,184 A | 7/1999 | Holmes-Farley et al. |
| 5,932,344 A | 8/1999 | Ikemoto et al. |
| 5,932,665 A | 8/1999 | DePorter et al. |
| 5,932,689 A | 8/1999 | Arkens et al. |
| 5,942,123 A | 8/1999 | McArdle |
| 5,977,224 A | 11/1999 | Cheung et al. |
| 5,977,232 A | 11/1999 | Arkens et al. |
| 5,981,719 A | 11/1999 | Woiszwillo et al. |
| 5,983,586 A | 11/1999 | Berdan, II et al. |
| 5,990,216 A | 11/1999 | Cai et al. |
| 6,072,086 A | 6/2000 | James et al. |
| 6,077,883 A | 6/2000 | Taylor et al. |
| 6,090,925 A | 7/2000 | Woiszwillo et al. |
| 6,114,033 A | 9/2000 | Ikemoto et al. |
| 6,114,464 A | 9/2000 | Reck et al. |
| 6,136,916 A | 10/2000 | Arkens et al. |
| 6,171,654 B1 | 1/2001 | Salsman et al. |
| 6,210,472 B1 | 4/2001 | Kwan et al. |
| 6,221,973 B1 | 4/2001 | Arkens et al. |
| 6,310,227 B1 | 10/2001 | Sarama et al. |
| 6,313,102 B1 | 11/2001 | Colaco et al. |
| 6,319,683 B1 | 11/2001 | James et al. |
| 6,331,350 B1 | 12/2001 | Taylor et al. |
| 6,379,739 B1 | 4/2002 | Formanek et al. |
| 6,395,856 B1 | 5/2002 | Petty et al. |
| 6,440,204 B1 | 8/2002 | Rogols et al. |
| 6,468,442 B2 | 10/2002 | Bytnar |
| 6,468,730 B2 | 10/2002 | Fujiwara et al. |
| 6,482,875 B2 | 11/2002 | Lorenz et al. |
| 6,495,656 B1 | 12/2002 | Haile et al. |
| 6,525,009 B2 | 2/2003 | Sachdev et al. |
| 6,613,378 B1 | 9/2003 | Erhan et al. |
| 6,638,882 B1 | 10/2003 | Helbing et al. |
| 6,638,884 B1 | 10/2003 | Quick et al. |
| 6,753,361 B2 | 6/2004 | Kroner et al. |
| 6,818,694 B2 | 11/2004 | Hindi et al. |
| 6,852,247 B2 | 2/2005 | Bytnar |
| 6,858,074 B2 | 2/2005 | Anderson et al. |
| 6,861,495 B2 | 3/2005 | Barsotti et al. |
| 6,864,044 B2 | 3/2005 | Ishikawa et al. |
| 6,955,844 B2 | 10/2005 | Tagge et al. |
| 7,029,717 B1 | 4/2006 | Ojima et al. |
| 7,067,579 B2 | 6/2006 | Taylor et al. |
| 7,090,745 B2 | 8/2006 | Beckman et al. |
| 7,141,626 B2 | 11/2006 | Rodrigues et al. |
| 7,195,792 B2 | 3/2007 | Boston et al. |
| 7,201,778 B2 | 4/2007 | Smith et al. |
| 2002/0032253 A1 | 3/2002 | Lorenz et al. |
| 2002/0091185 A1 | 7/2002 | Taylor et al. |
| 2002/0161108 A1 | 10/2002 | Schultz et al. |
| 2003/0005857 A1 | 1/2003 | Minami et al. |
| 2004/0019168 A1 | 1/2004 | Soerens et al. |
| 2004/0033747 A1 | 2/2004 | Miller et al. |
| 2004/0038017 A1 | 2/2004 | Tutin et al. |
| 2004/0077055 A1 | 4/2004 | Fosdick et al. |
| 2004/0122166 A1 | 6/2004 | O'Brien-Bernini et al. |
| 2004/0152824 A1 | 8/2004 | Dobrowolski |
| 2004/0249066 A1 | 12/2004 | Heinzman et al. |
| 2004/0254285 A1 | 12/2004 | Rodrigues et al. |
| 2005/0059770 A1 | 3/2005 | Srinivasan |
| 2005/0171085 A1 | 8/2005 | Pinto et al. |
| 2005/0196421 A1 | 9/2005 | Hunter et al. |
| 2005/0202224 A1 | 9/2005 | Helbing et al. |
| 2005/0215153 A1 | 9/2005 | Cossement et al. |
| 2005/0275133 A1 | 12/2005 | Cabell et al. |
| 2006/0099870 A1 | 5/2006 | Garcia et al. |
| 2006/0111480 A1 | 5/2006 | Hansen |
| 2006/0135433 A1 | 6/2006 | Murray et al. |
| 2006/0252855 A1 | 11/2006 | Pisanova et al. |
| 2007/0006390 A1 | 1/2007 | Clamen et al. |
| 2007/0009582 A1 | 1/2007 | Madsen et al. |
| 2007/0027283 A1 | 2/2007 | Swift et al. |
| 2007/0123679 A1 | 5/2007 | Swift et al. |
| 2008/0108741 A1 | 5/2008 | Van Herwijnen et al. |

FOREIGN PATENT DOCUMENTS

| | | |
|---|---|---|
| EP | 0 524 518 | 7/1992 |
| EP | 0547819 A2 | 12/1992 |
| EP | 0 583 086 | 7/1993 |
| EP | 0 672 720 | 3/1995 |
| EP | 0 714 754 | 6/1996 |
| EP | 0 826 710 | 8/1997 |
| EP | 0 873 976 | 4/1998 |
| EP | 0 882 756 | 12/1998 |
| EP | 0 911 361 | 4/1999 |
| EP | 0 990 729 | 4/2000 |
| EP | 1 038 433 | 9/2000 |
| EP | 1 193 288 | 9/2001 |
| EP | 1 225 193 | 7/2002 |
| EP | 1 486 547 | 6/2004 |
| EP | 1698598 | 9/2006 |
| FR | 2 614 388 | 10/1988 |
| GB | 2 078 805 | 1/1982 |
| JP | 57-101100 | 6/1982 |
| JP | 58-11193 | 1/1983 |
| JP | 3-173680 | 7/1991 |
| JP | 7-34023 | 2/1995 |
| JP | 2002-293576 | 9/2002 |
| JP | 2004-60058 | 2/2004 |
| SU | 374400 | 3/1973 |
| WO | 9417004 | 8/1994 |
| WO | 99/47765 | 9/1999 |
| WO | 00/62628 | 10/2000 |
| WO | 03/071879 | 9/2003 |
| WO | 2004/076734 | 9/2004 |
| WO | 2006/044302 | 4/2006 |
| WO | 2006/136614 | 12/2006 |
| WO | WO2007/014236 | 2/2007 |
| WO | WO2007/024020 | 3/2007 |

OTHER PUBLICATIONS

English Translation of French Abstract for 2614388, Oct. 28, 1988, 1 page.

English Translation of Japanese Abstract for 2002-293576, Oct. 9, 2002, 2 pages.

English Translation of Japanese Abstract for 57-101100, Jun. 23, 1982, 1 page.

English Translation of European Abstract for 1038433, Sep. 27, 2000, 1 page.

International Search Report and Written Opinion for PCT/US2008/059730, completed Sep. 16, 2008, 1 page.

Hodge, J.E., Chemistry of Browning Reactions in Model Systems,: 1953, J. Argic. Food Chem., vol. 1, No. 15, pp. 928-943.

International Search Report and Written Opinion for PCT/US2008/069046, completed Sep. 22, 2008, 1 page.

International Search Report/Written Opinion for PCT/EP2008/060185 completed Oct. 14, 2008.

Office Action for co-pending U.S. Appl. No. 12/524,522 5 pages).

Office Action for co-pending U.S. Appl. No. 12/671,922 11 pages).

BINDERS

CROSS-REFERENCE TO RELATED APPLICATIONS

This application is a U.S. national counterpart application of International Application Serial No. PCT/EP2008/060185, filed Aug. 1, 2008, under 35 USC §371, which claims priority to European Patent Application Serial Number 0715100.4, filed on Aug. 3, 2007, European Patent Application Serial Number 0807777.8, filed Apr. 29, 2008, and European Patent Application Serial Number 0810297.2, filed Jun. 6, 2008 the entire disclosures of each are hereby incorporated herein by reference.

TECHNICAL

This invention relates to binders, for example for glass wool or stone wool insulation.

BACKGROUND

WO 2007/014236 (incorporated herein by reference) relates to binders, including binders comprising Maillard reactants. One particular binder disclosed is based on a tri-ammonium citrate-dextrose system derived from mixing dextrose monohydrate, anhydrous citric acid, water and aqueous ammonia. One of the many advantages of this binder system is that it is formaldehyde free.

SUMMARY

One aspect of the present invention provides a binder solution in accordance with claim 1; the dependent claims define alternative and/or preferred embodiments.

In another aspect, the present invention provides a binder solution comprising a solution obtainable by dissolving a carbohydrate, an acid precursor derivable form an inorganic salt, a source of nitrogen optionally an organic acid or a precursor thereof and optionally ammonia.

Binder solutions used in accordance with the present invention may be "substantially formaldehyde free", that is to say that they liberate less than 5 ppm formaldehyde as a result of drying and/or curing (or appropriate tests simulating drying and/or curing). Such binder solutions are preferably "formaldehyde free", that is the say they liberate less than 1 ppm formaldehyde in such conditions.

Products in accordance with the invention which incorporate binders (for example insulation materials or wood boards) may be "substantially formaldehyde free", that is to say that they comprise less than 5 ppm or less than detectable limits of free formaldehyde and/or consist of materials which together comprise less than these amounts of free formaldehyde and/or release levels of formaldehyde in standardised tests adapted to simulate their ordinary use which allows them to be classified as having no or undetectable levels of formaldehyde release. Preferably, such products release less than 10 µg/m$^3$, more preferably less than 5 µg/m$^3$ of formaldehyde during the period of 24-48 hours from the start of testing in accordance with ISO 16000.

DETAILED DESCRIPTION

Figure 1:
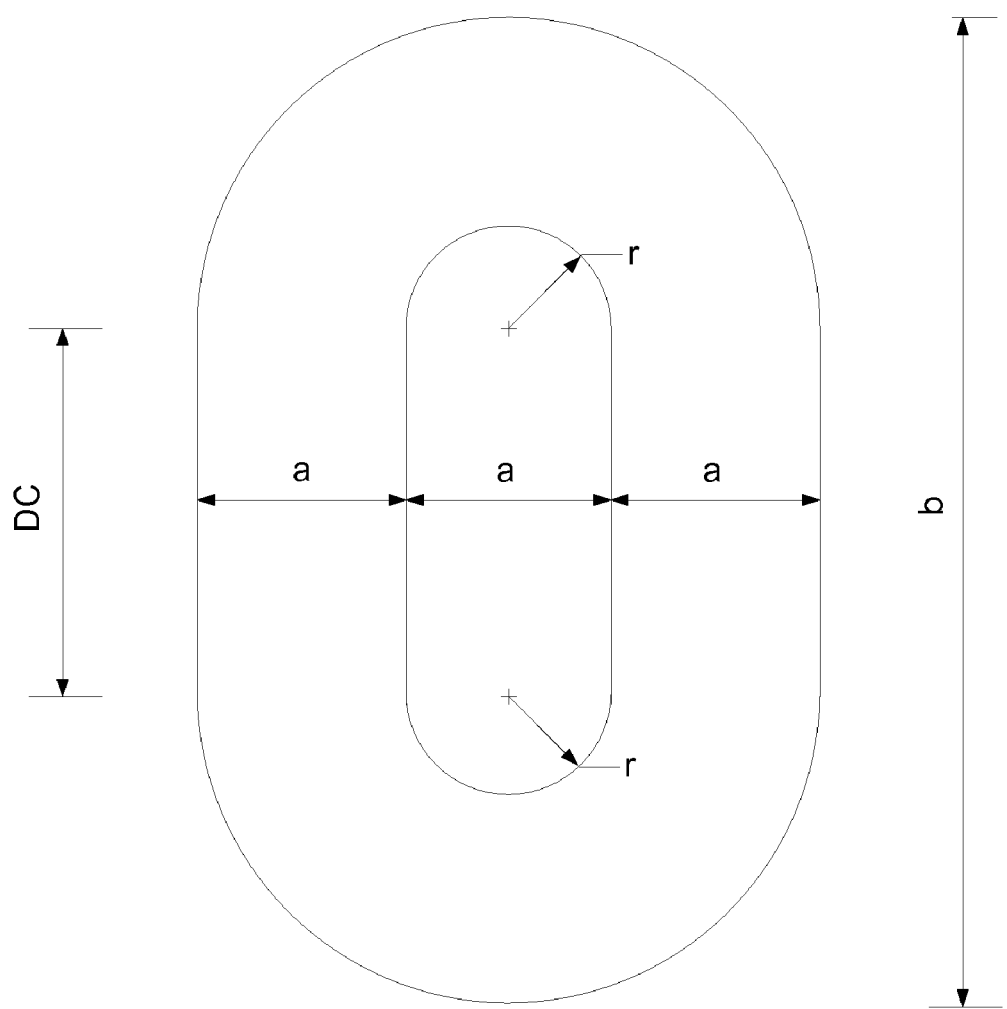
FIG. 1 shows a plan view of a mineral fibre test sample, where r is radius=12.7 mm, DC is distance between centers=44.5 mm, a=25.4 mm, and b=121 mm.

It has been found that binders according to the present invention may have at least equivalent and indeed improved properties compared to, for example, the tri-ammonium citrate-dextrose system of WO 2007/014236. WO 2007/014236 teaches binder systems based, inter alia, on a combination of a carbohydrate (for example a reducing sugar), ammonia and a carboxylic acid and suggests that a Maillard type reaction may form the basis of the curing chemistry. It would have been thought that the nature of the acid used would have a significant effect upon the properties of the cured binder, particularly if the acid precursor and/or a derivative therefrom is incorporated into the structure of the cured binder. It is thus surprising that an acid precursor derivable from an inorganic salt should provide a suitable acid precursor in an otherwise apparently similar binder system.

Use of an acid precursor derivable from an inorganic salt may have significant advantages in terms of cost, availability and ease of handling. The acid precursor derivable from an inorganic salt of the binder solution may comprise a species selected from the group consisting of sulphates, phosphates, nitrates and carbonates. A particular advantage can be achieved by use of one or more inorganic ammonium salts, for example, an ammonium sulphate, an ammonium phosphate or an ammonium carbonate. An ammonium salt may provide the or part of the acid precursor and/or the or part of the source of nitrogen and/or the or part of a pH control system. An ammonium nitrate may also work; however, ammonium nitrate may oxidise aldehyde groups of the carbohydrate (for example in the case of dextrose) and/or require precautions to avoid explosions.

An ammonium sulphate is particularly advantageous but ammonium phosphate may be used in addition to or instead of this. Ammonium phosphate may be mono ammonium phosphate, di ammonium phosphate or tri ammonium phosphate; it may be an ammonium hydrogen phosphate. An ammonium carbonate, alone or in combination with the other materials disclosed herein, may also provide good results. The ammonium carbonate may be an ammonium bicarbonate.

The acid precursor, particularly when this consists essentially of inorganic ammonium salt(s), may make up at least 5%, preferably at least 7%, more preferably at least 9% by dry weight of the uncured binder solution; and/or less than 25% or 20%, preferably less than 18%, more preferably less than 16% by dry weight of the uncured binder solution.

The term "consist or consisting essentially of" is intended to limit the scope of a claim to the specified materials or steps and those that do not materially affect the basic and novel characteristic(s) of the claimed invention.

The acid may comprise: a sulphuric acid, a phosphoric acid, a nitric acid or a weak acid.

The binder may comprise between 5% and 25%, preferably 10% to 20%, more preferably 15% to 20% by dry weight of acid precursor (particularly where this is an inorganic ammonium salt) to carbohydrate (particularly when this is a sugar).

Where the binder comprises both an acid precursor derivable from an inorganic salt and an organic acid, these may be present in the following amounts by dry weight with respect to the carbohydrate (particularly where this is a sugar):

|  | Preferred | More preferred | Most preferred |
|---|---|---|---|
| acid precursor derivable from an inorganic salt | At least 2.5% | At least 5% |  |
| organic acid | At least 2.5% | At least 5% |  |
| Combination of organic acid and acid precursor derivable from an inorganic salt | 5-25% | 10-20% | 15-20% |

Where an organic acid is used, this is preferably derived from an ammonium salt. For example, an ammonium citrate, particularly tri-ammonium citrate may be used as a source of citric acid.

Prior art phenol formaldehyde binder systems for mineral wool insulation have been used with the addition of about 2% by weight ammonium sulphate as a curing agent. However, the chemistry of such phenol formaldehyde binder systems is not comparable to the binder systems of the present invention which are not based on phenol and/or formaldehyde and/or on other phenolics.

A carbohydrate may be used in the binder solution rather than specifically a reducing sugar and may comprise a monosaccharide, for example in its aldose or ketose form. Preferably, the carbohydrate comprises a sugar, more preferably a reducing sugar or a reactant that yields a reducing sugar in situ under thermal curing condition; it may comprise glucose (ie dextrose). The carbohydrate may comprise a carbohydrate having a reducing aldehyde. It is believed that the use of a reducing sugar and particularly dextrose gives good binder strengths, particularly for the manufacture of mineral wool insulation products. The dextrose need not be 100% pure but use of a material having a dextrose equivalent value of at least 0.85, preferably at least 0.9 and more preferably at least 0.95 is thought to be advantageous. The dextrose equivalent value DE can be thought of as i) a measure of de-polymerization and is roughly: $DE=100/dp$ where dp stands for degree of polymerization or ii) the total amount of reducing sugars calculated as D-glucose (dextrose) on a dry basis.

Preferably, the binder solution and/or the binder is free or substantially free of starch; the presence of substantial quantities of starch is thought to increase the curing time and/or reduce the strength of the cured binder. The binder solution and/or the binder may be free or substantially free of proteins.

Industrial, non-food grade dextrose may be used as the reducing sugar; products such as Sirodex331 which is a 75% solids sugar solution obtainable from Tate and Lyle with a DE value of 94.5 may be used.

The reducing sugar may consist essentially of dextrose. Particularly in this case and more particularly where, in addition, the acid precursor consists essentially of an ammonium salt, for example an ammonium sulphate, the ratio by dry weight of the amount of reducing sugar/the amount of acid precursor may be greater than or equal to 2.5 and/or less than or equal to 13.

The source of nitrogen may be an amine or an amine reactant; it may be derivable from the same source as the acid precursor, for example, from an inorganic ammonium salt. It is preferably ammonia in solution.

Precursors for and/or reactants which give the materials referred to may be used.

In one embodiment, the binder is derived essentially from a reducing sugar and an inorganic ammonium salt in aqueous solution.

In another embodiment, the binder may also comprise an organic acid, particularly a carboxylic acid; this may be a polycarboxylic acid, particularly a bi-carboxylic acid or tri-carboxylic acid, preferably citric acid; it is preferably monomeric. The combination of an organic acid (or a precursor a salt or an anhydride thereof) with an acid precursor derivable from an inorganic salt may present various advantages. Firstly, such a combination may reduce the risk of punking (which has been observed with such binders based solely on organic acids) whilst providing acceptable strength. Punking is a term of art in the mineral fibre insulation area which generally denotes a comparatively rapid oxidation of a binder with a concomitant generation of heat in a finished and generally packaged insulation product. Punking generally causes generation of fumes and discolouring of the insulation material. It may be associated with exothermic reactions which increase the temperatures through the thickness of the insulation material; this may destroy the integrity of the insulation product and/or present a fire hazard.

Alternatively or additionally, the combination of an organic acid (or a precursor, a salt or an anhydride thereof) with an acid precursor derivable from an inorganic salt may moderate acid conditions occurring during curing and thus reduce the risk or tendency of such conditions to cause significant damage to the material being bound. Such a combination may be particularly advantageous as a binder for stone wool insulation whose fibres may be more susceptible to potential damage by acid than, for example, glass wool insulation.

In a further embodiment, the binder is derived essentially from: a carbohydrate; an inorganic ammonium salt; and an organic acid and/or organic acid precursor; in aqueous solution.

Binders which comprise or consist essentially of the components described herein may include additives, for example, additives selected from: silanes, mineral oils, coupling agents, silicones or siloxanes (particularly for water repellency), silicon containing compounds, surfactants, hydrophilic additives, hydrophobic additives, waxes, substances useful for controlling the pH (e.g. ammonium hydroxide) and ammonia. Ammonium hydroxide when used, and indeed other additives, may provide the and/or an additional source of nitrogen.

Preferably, the total quantity of additives (excluding ammonia) is less than 5% by weight (excluding the weight of water present), more preferably less than 3% or less than 2% by weight.

Particularly for mineral fibre products, it is preferred to include a silane as an additive. The binder and/or binder solution may comprise at least 0.1% and/or less than 1% of a silane by dry weight. The silane may be amino substituted; it may be a silyl ether and it is believed that its presence may significantly improve the long term strength of the binder, particularly after weathering.

Preferences for the pH of the binder are:

|  | Preferred | More preferred | Most preferred |
|---|---|---|---|
| pH of binder | $\geq 7$ | $\geq 8$ | $\geq 9$ | at least in the state in which the binder is applied to a material to be bound and/or recovered in a waste water recuperation system. Such a neutral or alkaline pH of the binder may alleviate problems of corrosion of manufacturing equipment which have been encountered with some essentially acidic prior art binder systems. Such prior art binders include binders consisting essentially of polyacrylic acids or polymer polycarboxylic acids. One particular advantage of the present invention is thus the use of a binder system that can operate in such neutral or alkaline conditions. When cured, the binder may become acidic during the curing process. However, equipment corrosion considerations are less significant in this case due to the minimal contact between the manufacturing equipment and the binder when in this state. The pH of the binder may be less than or equal to 13, preferably less than or equal to 12, 11 or 10. A preferred pH may be in the range of 7.5 to 9.5, particularly 8 to 9. Binder which has been applied to the material to be bound and is subsequently dissolved in water may have a pH of greater than 6.

It is preferred to arrange the pH of the binder solution at an appropriate level to prevent precipitation of its constituents and particularly to ensure that the acid precursor derivable from an inorganic salt remains in solution. This is particularly the case where ammonium phosphate provides the acid precursor. Better dry and/or weathered strengths and/or more homogeneous products may be achieved by using homogeneous binder solutions comprising ammonium salt acid precursors which are free from precipitates, particularly when ammonium phosphate is used and the binder solution is free from phosphate precipitates.

The binder composition may be provided in the form of an aqueous solution; it may contain free ammonia or excess ammonia in solution. A neutral or alkaline pH of the binder may be generated by an excess of alkaline groups compared with acid groups present in the binder solution, for example, due partially or substantially to the presence of ammonia in the solution. Additional ammonia may be added to the binder solution, for example 0.2%-1% by weight, or indeed more; this may help to keep a wash water system alkaline over the long term, particularly for the manufacture of mineral wool insulation.

In the case or mineral wool fibres particularly for thermal insulation products, when binder solution is sprayed on to hot mineral wool fibres just after they have been formed, the residual heat of the mineral wool fibres may cause a significant portion of any water in the binder solution to evaporate. Consequently, the mineral wool fibres which are then collected to form a bat may have binder present on them in the form of a sticky, viscous or tacky liquid. This may facilitate bonding between individual fibres via the binder.

One of the many advantages of this binder system is that it is applied, for example sprayed onto mineral wool fibers, in a substantially unreacted state. The ability to apply the binder solution in a substantially unreacted state may alleviate problems associated with pre-reacting the binder components in solution which have been encountered with some prior art binder systems in which the components are pre-reacted. Such prior art binders include binders consisting essentially of pre-reacted polymers or resins which are applied to the materials to be bound. With substantially unreacted binder present in the form of a sticky, viscous or tacky liquid on the material to be bound, the reaction between the binder components may occur in a substantially dry state. One may describe the reaction as a bulk polymerization because it is occurring without the benefit of a solvent. A particular advantage of the present invention is thus the use of a binder system that can polymerise in a substantially dry state or through a bulk polymerisation.

Mineral fibres used in the context of the invention may be formed by internal or external spinning. They may have a temperature in the range 20° C. to 200° C., generally 30° C. to 100° C. or 150° C., when sprayed with the binder solution.

The quantity of binder solution sprayed may be used with or without additional water sprays to assist in cooling the mineral fibres to a desired temperature between their formation and their collection to form a batt.

A particular advantage of using ammonia in solution to control the pH of the binder solution applied to the mineral fibres is that at least part of the ammonia of binder solution that sticks to the fibres may flash off due to the residual heat of the mineral wool fibres. Consequently, the binder solution that coats the fibres may have a lower pH than the binder solution sprayed.

The invention extends to a method of manufacturing a mineral fibre thermal insulation product comprising the sequential steps of:
  Forming mineral fibres from a molten mineral mixture;
  spraying a substantially formaldehyde free binder solution on to the mineral fibres, the binder solution comprising:
    a carbohydrate (particularly a reducing sugar), an acid precursor derivable from an inorganic salt and a source of nitrogen;
  Collecting the mineral fibres to which the binder solution has been applied to form a batt of mineral fibres; and
  Curing the bat comprising the mineral fibres and the binder by passing the batt through a curing oven so as to provide a bat of mineral fibres held together by a substantially water insoluble cured binder.

Wash water may be sprayed on to mineral fibres between their formation and their collection to form a bat, at least a part of the wash water having been sprayed on mineral fibres and subsequently returned to a wash water system to be reused as wash water. The binder solution may comprise wash water.

The binder may be curable; it may be cured, for example in a curing oven; it may form a thermoset binder. In its cured form, the binder may: comprise melanoidins; and/or be thermoset; and/or be water insoluble or substantially water insoluble. The binder solution may be substantially colourless or white to off-white; upon curing, the binder may take on a dark colour, particularly a dark brown colour. The cured product may be dark in colour, particularly dark brown in colour. The binder may be free of proteins; it may be free of cellulosic feedstock. One of the many advantages of this binder system is that the extent of curing can be determined by the colour. Substantially dehydrated binder appears white or off-white. Progressively cured to a greater extent, the binder appears progressively darker in colour (a darker shade of brown). When applied to mineral fibers, the extent to which the mineral wool insulation has cured can be determined by its colour.

When applied to the material to be bound and/or prior to curing, the binder may be free or substantially free of melanoidins and/or other reaction products derived from curing. Curing of the binder may produce glucosylamine, particularly as an intermediate product. Consequently, a cured or particularly a partially cured product may comprise glucosylamine.

The reaction of the binder upon curing may be essentially a Maillard type reaction as described for example in US Patent Application 20070027283 or WO2007/14236. The binder may comprise polymerisation products of a mixture that comprises a reducing sugar and a material selected from the group consisting of ammonium sulphate, ammonium phosphate, ammonium nitrate and ammonium carbonate.

The binder solution may be formulated by combining:
  A carbohydrate, preferably a reducing sugar;
  An acid precursor derivable from an inorganic salt, preferably an ammonium sulphate or ammonium phosphate;
  A source of nitrogen; and
  water.

The formulation may comprise optional or additional ammonia provided in the form of an aqueous ammonia solution. The water may comprise wash water or recycled process water.

Forming the binder solution from a carbohydrate and an acid precursor comprising an inorganic ammonium salt provides one particular advantageous preparation method. This may be achieved in a simple mixing chamber which may be open and/or at atmospheric pressure. The carbohydrate and/or the acid precursor may be added in powder or liquid form. The preparation is preferably carried out at room temperature. Preferably it is not necessary to supply heat to prepare the binder solution; nevertheless, the binder solution may be heated during its preparation, for example to a temperature with the range 20° C. to 80° C., particularly where this facilitates dissolving and/or mixing of its ingredients.

The binder solution, particularly in the state applied to the material to be bound, may comprise:
  at least 5% 10%, 15% or 18% solids and/or
  less than 70% or 60% (particularly in the case of wood board applications) or less than 50%, 40% or 20% solids (particularly in the case of mineral fibre insulation applications)
particularly determined as bake out solids by weight after drying at 140° C. for 2 hours.

The collection of loose matter bound together by means of the binder solution may comprise materials selected from: fibres, fibrous materials, mineral fibres, glass fibres, stone wool fibres, cellulosic fibres (including wood fibres, wood shavings, wood particles and sawdust), wood veneers, facings, wood facings, particles, woven or non-woven materials, loosely assembled materials, woven or non-woven materials.

The binder solution and/or the binder are preferably organic.

The loose matter may be shaped and/or dimensioned and/or moulded with the aid of the binder. The material produced may be selected from: a thermal insulation material, a mineral fibre product, a wood board product (including chip board, orientated strand board, particle board, medium density fibre board, wood facing products), foundry sands.

The matter to be bound may be at a temperature in the range 20° C. to 100° C. when the binder is applied. Particularly in the case of wood boards products, the binder and the loose matter may be mechanically mixed, for example by tumbling. The binder solution, particularly when applied to the loose matter, may have a viscosity appropriate for application by spraying or pouring. Its viscosity at 20° C. may be:
  Less than about 1.5 Pa·s, preferably less than about $1 \times 10^{-2}$ Pa·s; and/or
  Greater that about $2 \times 10^{-4}$ Pa·s, preferably greater than about $5 \times 10^{-4}$ Pa·s Curing of the binder may occur in a curing oven, for example using forced hot air circulation; it may occur in a press. Curing may comprise a dehydration of the binder; it may comprise a polymerisation; it may comprise a bulk polymerisation reaction. Curing may be carried out for duration of 20 minutes or less, preferably 10 minutes or less; it may be carried out by passing the product (for example a mineral fibre batt) through at least one zone of a curing oven at a temperature within the range 230° C.-300° C. with an oven residence time in the range 30 seconds to 20 minutes. Curing of the binder preferably occurs when the binder solution (from which water may have been evaporated) is in contact with the loose matter; it may occur at substantially atmospheric pressure. The curing may be a substantially dry curing, that is to say by application of dry heat and/or substantially dry or heated atmospheric air rather than using steam or heated water vapour.

Particularly in the case of mineral fibre insulation products, the curing temperature and time may be selected as a function of the product density and/or thickness. The curing oven in such cases may have a plurality of heating zones having temperatures within the range 200° C. to 350° C. (typically 230° C. to 300° C.). A thin, low density product (12 kg/m$^3$ or less) may be cured by passing through the curing oven in as little as 20 seconds; a thick, high density product (80 kg/m$^3$ or more) may require a passage of 15 minutes or more in the curing oven. The product may reach a temperature in the range 180° C.-220° C. during the curing process.

The cured binder may comprise greater than 2% and/or less than 8% nitrogen by mass as determined by elemental analysis.

The binder in its uncured state may comprise the following levels of sulphates, phosphates carbonates and/or nitrates by dry weight:
  Greater than 2.5%, 3% or 5%; and/or
  Less than 25%, 22%, or 20%

Finished materials manufactured using binder systems according to the present invention may have residual levels of sulphates, phosphates, carbonates and/or nitrates derived notably from the inorganic salt serving as the acid precursor. Such species may be present in the following quantities:
  Greater than 500, 750, 1000 or 1500 mg/kg; and/or
  Less than 5000, 4000 or 3000 mg/kg.

The presence of such species may be assessed in a leach test and provide an indication in the final product of the binder system used.

The quantity of binder in the finished product, particularly in the case of mineral wool insulation, may be:
  Greater than: 1%, 2%, 2.5%, 3%, 3.5% or 4%; and/or
  Less than: 20%, 15%, 10% or 8%
measured by dry weight of the finished product.

Particularly in the case of mineral fibre insulation, the products may have one or more of the following parting strengths:
Ordinary Parting Strength of
  At least 120 g/g, preferably at least 150 g/g; and/or
  Less than 400 g/g
Weathered Parting Strength of
  At least 120 g/g, preferably at least 150 g/g; and/or
  Less than 400 g/g
% loss between Ordinary and Weathered Parting Strength of
  Less than 10%, preferably less than 5%
Where the product is mineral wool insulation may have one or more of the following characteristics:
  A density greater than 5, 8 or 10 kg/m$^3$;
  A density less than 200, 180 or 150 km/m$^3$
  Comprise glass wool fibres and have a density greater than 5, 8 or 10 kg/m$^3$ and/or less than 80, 60 or 50 kg/m$^3$;
  Comprise stone wool fibres and have a density greater than 15, 20 or 25 kg/m$^3$ and/or less than 220, 200 or 180 kg/m$^3$;
  A thermal conductivity λ of less than 0.05 W/mK and/or greater than 0.02 W/mK
  Comprise less than 99% by weight and/or more than 80% by weight mineral fibres.
  A thickness of greater than 10 mm, 15 mm or 20 mm and/or less than 400 mm, 350 mm or 300 mm.
Where the product is wood board product, it may have one or more of the following characteristics:
  Dimensions of at least 50 cm×80 cm, preferably at least 1 m×2 m Thickness of at least 11 mm, 12 mm or 15 mm A curing time of less than 25, 15, 12 or 10 minutes An internal bond strength measured in accordance with EN319 of at least: 0.4 N/mm$^2$ or 0.45 N/mm$^2$ (particularly for particle board or fibre boards) or measured in accordance with EN300 of at least 0.28 N/mm$^2$ (particularly for orientated strand board)

A thickness swelling after 24 hours in water at 20° C. according to EN317 of less than 12%, preferably less than 10%

A water absorption after 24 hours in water at 20° C. of less than 40%, preferably less than 30%

A modulus of elasticity according to EN310 of at least: 1800 N/mm$^2$ (particularly for particle board or fibre boards) or 2500 N/mm$^2$ (particularly for orientated strand board) or 3500 N/mm$^2$ or 4800 N/mm$^2$ A bending strength (MOR) of at least: 14 N/m$^2$ (particularly for particle board or fibre boards) or 18 N/mm$^2$ (particularly for orientated strand board) or 20 N/mm$^2$ or 28 N/mm$^2$ Wax as an additive, for example in the range 0.1 to 2% by weight, preferably 0.5 to 1% by weight A resin content (weight of dry resin to weight of dry wood particles) in the range 8 to 18% by weight, preferably 10 to 16% by weight, more preferably 12 to 14% by weight.

Be cured in a press, particularly between platens have a temperature of greater than 180° C. or 200° C. and/or less than 280° C. or 260° C.

Embodiments of the invention will now be described by way of example with reference to FIG. 1 which is a plan view of a mineral fibre test sample.

Shell Bone Testing:

Binders were prepared as aqueous solutions by
combining the ingredients of a desired binder formulation in an open, unheated reaction vessel
adding distilled water
subsequently adding a silane solution
agitating during addition of liquids and afterwards for several minutes to achieve complete dissolution of solids
such that the binder solution contained approximately 45% dissolved solids as a percentage of total weight of solution. A 2-g sample of this solution, upon thermal curing at about 200° C. to 210° C. for 8 minutes, would yield 30% solids (the weight loss being attributed to dehydration during thermoset binder formation).

An evaluation of dry and "weathered" tensile strength of glass bead-containing shell bones provided an indication of the likely tensile strength and the likely durability of fibreglass insulation or other materials prepared with that particular binder. Predicted durability is based on the ratio of a shell bone's weathered tensile strength to its dry tensile strength.

To prepare the shell bones, an electric mixer was used for about two minutes to mix approximately 75 g of binder with 727.5 g of glass beads (equivalent to Quality Ballotini Impact Beads, Spec. AD, US Sieve 70-140, 106-212 micron-#7, from Potters Industries, Inc.). Any clumps from the sides of the mixer whisk and from the sides and bottom of the mixing bowl were mixed in manually using a spatula about half way through the mixing and also at the end of the mixing.

The prepared glass beads/binder mixture was added to the mould cavities of a shell bone mould (Dietert Foundry Testing Equipment; Heated Shell Curing Accessory, Model 366) which had been pre-heated to about 218° C. (425° F.). The surface of the mixture in each cavity was flattened out, while scraping off the excess mixture to give a uniform surface area to the shell bone. Any inconsistencies or gaps that existed in any of the cavities were filled in with additional glass beads/binder mixture and then flattened out. The top platen was quickly placed onto the bottom platen (to avoid producing shell bones with two differentially cured layers). The cured shell bones were removed after seven minutes, cooled to room temperature on a wire rack, labelled and placed individually in plastic storage bags. If shell bones could not be tested on the day they were prepared, the shell bone-containing plastic bags were placed in a dessiccator unit. During curing the temperature of the bottom platen ranged from about 204° C. to about 221° C. (about 400° F. to about 430° F.), while the temperature of the top platen ranged from about 227° C. to about 243° C. (about 440° F. to about 470° F.).

Procedure for Testing Breaking Strength:

Equipment: 5500 R Instron machine

Immediately prior to testing, each shell bone was removed from is plastic bag and its weight and thickness recorded.

Weathering Procedure for Shell Bones:

16 hours weathering in a pre-heated humidity chamber (65° C., 95% relative humidity)

upon removal shell bones were sealed in individual plastic storage bags and taken immediately for testing.

Procedure for Measuring Gel Time:

A small amount of binder (2.0 ml) is added to the centre of a hot plate set to 150° C. and a stop watch is started. The binder is worked with a spatula until it is possible to draw the sample into a long string. The time taken from the addition of the binder to the string formation is the gel time.

Binder Formulations Tested—Inorganic Acid Precursors Compared with Citric Acid:

| Test ref: | Binder formulation (by dry weight) |
|---|---|
| A | 85% DMH + 15% CA + 4.8% NH4OH + 0.3% ISI0200 |
| B | 90% DMH + 10% AmSO4 + 4.8% NH4OH + 0.3% ISI0200 |
| C | 85% DMH + 15% AmSO4 + 4.8% NH4OH + 0.3% ISI0200 |
| D | 80% DMH + 20% AmSO4 + 4.8% NH4OH + 0.3% ISI0200 |
| E | 90% DMH + 10% AmPO4 + 4.8% NH4OH + 0.3% ISI0200 |
| F | 85% DMH + 15% AmPO4 + 4.8% NH4OH + 0.3% ISI0200 |
| G | 80% DMH + 20% AmPO4 + 4.8% NH4OH + 0.3% ISI0200 |

Binder Formulations Tested—Combined Inorganic Acid Precursor and Citric Acid Compared with Citric Acid Alone and Inorganic Acid Precursor Alone:

| Test ref: | Binder formulation (by dry weight) |
|---|---|
| H | 85% DMH + 15% CA + 4.8% NH4OH + 0.3% ISI0200 |
| I | 85% DMH + 10% CA + 5% AmSO4 + 4.8% NH4OH + 0.3% ISI0200 |
| J | 85% DMH + 5% CA + 10% AmSO4 + 4.8% NH4OH + 0.3% ISI0200 |
| K | 85% DMH + 15% AmSO4 + 4.8% NH4OH + 0.3% ISI0200 |

Key:
DMH = Dextrose monohydrate
CA = citric acid
NH4OH = ammonium hydroxide
ISI0200 = silane
AmSO4 = ammonium sulphate
AmPO4 = ammonium phosphate Test Results—Inorganic Acid Precursors Compared with Citric Acid:

| Test ref | Dry breaking strength (MN/m$^2$) | Weathered breaking strength (MN/m$^2$) | Loss in breaking strength from weathering/% | Gel time of binder solution (s) | pH of binder solution just before mixing with beads |
|---|---|---|---|---|---|
| A | 1.455 | 1.567 | −7.70 | 343 | 9.54 |
| B | 1.271 | 0.895 | 29.57 | 280 | 10.28 |
| C | 1.550 | 0.856 | 44.79 | 362 | 10.24 |
| D | 1.877 | 1.156 | 38.39 | 327 | 10.13 |
| E | 1.499 | 1.069 | 28.68 | 356 | 10.18 |
| F | 1.281 | 0.848 | 33.82 | 334 | 9.99 |
| G | 1.123 | 0.801 | 28.74 | 287 | 9.73 |

Test Results—Combined Inorganic Acid Precursor and Citric Acid Compared with Citric Acid Alone and Inorganic Acid Precursor Alone:

| Test ref | Dry breaking strength (MN/m$^2$) | Weathered breaking strength (MN/m$^2$) | Loss in breaking strength from weathering/% | Gel time of binder solution (s) | pH of binder solution just before mixing with beads |
|---|---|---|---|---|---|
| H | 1.69 | 1.50 | 11.32 | 363 | 9.39 |
| I | 1.50 | 1.18 | 21.37 | 341 | 9.71 |
| J | 1.21 | 1.05 | 13.19 | 375 | 9.99 |
| K | 1.47 | 1.02 | 30.33 | 376 | 9.97 |

Results from tests carried out together (test A to G were carried out in one session and tests H to K carried out during another session) provide a useful indication of results relative to other results obtained during the same test session. It may not be reliable to compare tests results from different test sessions.

First Comparative Testing on Insulation Product:

Comparative testing of binder systems on a mineral fibre insulation product gave the following results:

| Binder tested | Description | Formulation |
|---|---|---|
| PF1 | Comparative example - standard phenol formaldehyde binder | Resin, Urea, Lignin, Ammonia, Silane |
| AC1 | Comparative example - ammonium citrate based binder | Dextrose 85% Citric Acid 15% Ammonia 4.8% Silane 0.3% |
| Ex1 | Example 1 of the present invention | Dextrose 85% Ammonium Sulphate 15% Ammonia 4.8% Silane 0.3% |
| Product used for test: | glass wool fibre insulation product, nominal density 16 kg/m$^3$, nominal thickness 75 mm, nominal width 455 mm | |

Binder Content of Test Product LOI (Loss on Ignition) % Weight:

| Binder | Mean LOI |
|---|---|
| PF1 | 6.22% |
| AC1 | 6.91% |
| Ex1 | 6.78% |

Drape Test (Mean Average in mm Measured after the Periods Specified):

| Binder | Day 1 | Week 1 | Week 3 | Week 6 |
|---|---|---|---|---|
| PF1 | 55 | 68 | 60 | 71 |
| AC1 | 83 | 99 | 80 | 72 |
| Ex1 | 66 | 76 | 66 | 75 |

Thickness (Mean Average in mm Measured after the Periods Specified in Accordance with British Standard BS EN 823: 1995)

| Binder | Day 1 | Week 1 | Week 3 | Week 6 |
|---|---|---|---|---|
| PF1 | 76.4 | 75.1 | 75.1 | 75.2 |
| AC1 | 75.3 | 73.6 | 72.5 | 74 |
| Ex1 | 76 | 76.7 | 74.9 | 74.3 |

Density (Mean Average in kg/m$^3$ Measured after the Periods Specified)

| Binder | Day 1 | Week 1 | Week 3 | Week 6 |
|---|---|---|---|---|
| PF1 | 16.44 | 16.7 | 16.35 | 16.44 |
| AC1 | 16.68 | 16.41 | 16.33 | 16.48 |
| Ex1 | 16.5 | 16.9 | 16.5 | 16.5 |

Quantity of Sulphates Present mg/kg

| Binder | Sample 1 | Sample 2 |
|---|---|---|
| AC1 | 240 | 240 |
| Ex1 | 2000 | 2200 |

Parting Strength (g/g)

| Binder | Ordinary | Weathered | % loss |
|---|---|---|---|
| PF1 | 248 | 107 | 56.85 |
| AC1 | 230 | 199 | 13.47 |
| Ex1 | 196 | 189 | 3.57 |

Test Procedures:
Binder Content LOI (Loss on Ignition)

A weighed sample of wool plus binder is placed in a muffle furnace set to 550° C. After a set time the wool is removed from the furnace, placed in a desiccator to cool and re-weighed. The weight loss is expressed as a percentage of the original sample weight and is known as the binder content or Loss On Ignition (LOI).

Drape Test

A single batt (or slab) is placed across two poles (each 500 mm long, 20 mm diameter) set into a wall 1 metre apart. The degree of sag in the centre of the bat is recorded. This is repeated for all of the batts in a pack and for several packs. Packs are measured at set points over a period of time to determine the long term effects of compression on the batts.

Density: measured for the samples subjected to the drape test
Quantity of sulphates present: leaching test for granular wastes in water with eluate analysis according to British standard BS EN 12457-2 at L/S10

Parting Strength

The parting strength is expressed in grams/gram being the total breaking load of six test specimens divided by their total weight.

The test is carried out on mineral fibre mats as received for testing (Ordinary Parting Strength) and after an accelerated weathering test as explained below (Weathered Parting Strength).

A first set of six samples of the form and dimensions shown in FIG. 1 are cut from the mineral fibre mat to be tested. The dimensions are:
r: radius 12.7 mm;
DC: distance between centres 44.5 mm;
a: 25.4 mm;
b: 121 mm.

The long axis of the samples should be parallel to the conveyor direction and the samples should be taken across the full width of the mineral mat. A second set of six samples is then taken in the same way.

The total weight of the first group of six samples W1 in grams is recorded.

The total weight of the second group of six samples W2 in grams is recorded; these samples are then placed in a preheated autoclave and conditioned on a wire mesh shelf away from the bottom of the chamber under wet steam at 35 kN/m² for one hour. They are then removed, dried in an oven at 100° C. for five minutes and tested immediately for parting strength.

To test the parting strength, each sample is mounted in turn on the jaws of a 5500 Instron tensile strength machine and the maximum breaking load in grams or Newtons is recorded. If the breaking load is measured in Newtons it is converted to grams by multiplying it by 101.9. Six results in grams are obtained for each set of samples: G1 G2 G3 G4 G5 and G6 for the first set of samples and G7 G8 G9 G10 G11 and G12 for the second set of samples.

The Ordinary Parting Strength is calculated from the first set of samples using the formula Ordinary Parting Strength= (G1+G2+G3+G4+G5+G6)/W1.

The Weathered Parting Strength is calculated from the second set of samples using the formula Weathered Parting Strength=(G7+G8+G9+G10+G11+G12)/W2.

Second Comparative Testing on Insulation Product:

| Product used for test: | glass wool fibre insulation product, nominal density 7.2 kg/m³, nominal thickness 159 mm |
|---|---|

SAMPLES: The following samples of fibreglass bats were tested:

| Example | Binder Description | Target binder content (LOI) for product |
|---|---|---|
| PF2 | standard phenol formaldehyde binder of Resin, Urea, Ammonia, Silane | 4.5% |
| 2.1 | Dextrose 85% Ammonium Sulphate 15% Silane 0.3% (10.6% solids in binder solution) | 4.5% |
| 2.2 | Dextrose 85% Ammonium Sulphate 15% Silane 0.3% Norjohn oil (11.4% solids in binder solution) | 4.5% |
| 2.3 | Dextrose 85% Ammonium Sulphate 15% Silane 0.3%, 2.4% NH3 (10.6% solids in binder solution) | 4.5% |
| 2.4 | Dextrose 85% Ammonium Sulphate 15% Silane 0.3%, 2.4% NH3 (10.6% solids in binder solution) | 6.0% |

Results

|  | PF2 | 2.1 | 2.2 | 2.3 | 2.4 |
|---|---|---|---|---|---|
| Recovery | 158 mm | 157 mm | 163 mm | 160 mm | 166 mm |
| Recovery. % nominal | 99.4% | 99.0% | 102.8% | 100.6% | 104.8% |
| Parting Strength (ASTM C-686) | 190.8 g/g | 131.7 g/g | 146.7 g/g | 159.9 g/g | 143.9 g/g |
| Parting strength after weathering (ASTM C-686 following conditioning for 7 days at 90° F., 90% relative humidity) | 145.9 g/g | 100.0 g/g | 110.3 g/g | 124.9 g/g | 114.3 g/g |

What is claimed is:

1. A substantially formaldehyde free binder solution consisting essentially of a solution obtainable by dissolving
   a reducing sugar, and
   at least 2.5% by dry weight with respect to the reducing sugar of a material selected from the group consisting of ammonium sulphate salts, ammonium phosphate salts, ammonium nitrate salts, ammonium carbonate salts, and combinations thereof
   in water.

2. The substantially formaldehyde free binder solution of claim 1, in which the reducing sugar consists essentially of dextrose and there is at least 7% by dry weight of the salt material with respect to dextrose.

3. The substantially formaldehyde free binder solution in accordance with claim 1, in which a carboxylic acid is included or provided in the form of an ammonium salt.

4. The substantially formaldehyde free binder solution in accordance with claim 1, in which the pH of the solution is greater than 7.

5. The substantially formaldehyde free binder solution in accordance with claim 1, in which the binder solution has a pH which, in its conditions of use, prevents precipitation of sulphates, phosphates, nitrates or carbonates.

6. The substantially formaldehyde free binder solution in accordance with claim 1, in which material selected from the group consisting of ammonium sulphate salts, ammonium phosphate salts, ammonium nitrate salts, ammonium carbonate salts, and combinations thereof makes up between 5% and 25% by dry weight of the binder solution.

7. The substantially formaldehyde free binder solution in accordance with claim 1, in which the binder solution contains at least 5% solids and less than 50% solids.

8. The substantially formaldehyde free binder solution in accordance with claim 1, in which the ratio by dry weight of reducing sugar to material selected from the group consisting of ammonium sulphate salts, ammonium phosphate salts, ammonium nitrate salts, ammonium carbonate salts, and combinations thereof (expressed as dry weight of reducing sugar/dry weight of ammonium salt) is in the range 2.5 to 13.

9. The substantially formaldehyde free binder solution in accordance with claim 1, in which the binder solution contains between 0.1% and 1% of a silane or silicon-containing coupling agent calculated as dissolved binder solids.

10. A method of manufacturing a product comprising the steps of:
    providing a collection of loose matter;
    treating the collection of loose matter with the substantially formaldehyde free binder solution of claim 1;
    arranging the collection of loose matter treated with the binder solution into the shape of the product; and
    curing the binder by applying a source of energy.

11. The method of claim 10, in which the curing of the binder is carried out by passing the arranged collection of loose matter treated with the binder solution through at least one zone of a curing oven at a temperature within the range 230° C.-300° C. with an oven residence time in the range 30 seconds to 20 minutes.

12. The method of claim 10, in which the curing of the binder is carried out by between platens of a press.

13. A material comprising a collection of loose matter and uncured or partially cured substantially formaldehyde free binder characterised in that the binder has a pH of greater than 6 when dissolved in water and comprises
    a reducing sugar, and
    at least 2.5% by dry weight with respect to the reducing sugar of an ammonium salt selected from the group consisting of ammonium sulphate salts, ammonium phosphate salts, ammonium nitrate salts, ammonium carbonate salts, and combinations thereof.

14. The material of claim 13 in which the loose matter comprises mineral fibres.

15. The material of claim 13, having more than 500 mg/kg of species selected from the group consisting of sulphates, phosphates, nitrates, carbonates, and combinations thereof.

16. The material of claim 15, in which the species selected from the group consisting of sulphates, phosphates, nitrates, carbonates, and combinations thereof is derived from the ammonium salt.

17. The material of claim 15, in which the binder is partially cured and comprises melanoidins.

\* \* \* \* \*

UNITED STATES PATENT AND TRADEMARK OFFICE
CERTIFICATE OF CORRECTION

| | | |
|---|---|---|
| PATENT NO. | : 8,114,210 B2 | Page 1 of 1 |
| APPLICATION NO. | : 12/599858 | |
| DATED | : February 14, 2012 | |
| INVENTOR(S) | : Carl Hampson et al. | |

It is certified that error appears in the above-identified patent and that said Letters Patent is hereby corrected as shown below:

On the Title Page

In the Abstract, the phrase "...an ammonium salt acid precursor optionally a carboxylic acid or a precursor thereof..." should read --...an ammonium salt acid precursor, optionally a carboxylic acid or a precursor thereof...--.

In the Specification

In Column 1, lines 9-13 of the CROSS-REFERENCE TO RELATED APPLICATIONS paragraph, the phrase "...which claims priority to European Patent Application Serial No. 0715100.4, filed on Aug. 3, 2007, European Patent Application Serial No. 0807777.8, filed Apr. 29, 2008, and European Patent Application Serial No. 0810297.2, filed Jun. 6, 2008..." should read --...which claims priority to Great Britain Patent Application Serial No. 0715100.4, filed on Aug. 3, 2007, Great Britain Application Serial No. 0807777.8, filed Apr. 29, 2008, and Great Britain Patent Application Serial No. 0810297.2, filed Jun. 6, 2008...--.

In Column 1, line 44 of the SUMMARY, the phrase "...a source of nitrogen..." should read --...a source of nitrogen,...--.

In the Claims

In Column 16, claim 12, the phrase "...in which the curing of the binder is carried out by between platens of a press." should read --...in which the curing of the binder is carried out between platens of a press.--.

Signed and Sealed this
Twenty-sixth Day of November, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO.         : 8,114,210 B2                                          Page 1 of 1
APPLICATION NO.    : 12/599858
DATED              : February 14, 2012
INVENTOR(S)        : :Carl Hampson et al.

It is certified that error appears in the above-identified patent and that said Letters Patent is hereby corrected as shown below:

On the Title Page

In the Abstract, the phrase "...an ammonium salt acid precursor optionally a carboxylic acid or a precursor thereof..." should read --...an ammonium salt acid precursor, optionally a carboxylic acid or a precursor thereof...--.

In the Specification

In Column 1, lines 9-13 of the CROSS-REFERENCE TO RELATED APPLICATIONS paragraph, the phrase "...which claims priority to European Patent Application Serial No. 0715100.4, filed on Aug. 3, 2007, European Patent Application Serial No. 0807777.8, filed Apr. 29, 2008, and European Patent Application Serial No. 0810297.2, filed Jun. 6, 2008..." should read --...which claims priority to Great Britain Patent Application Serial No. 0715100.4, filed on Aug. 3, 2007, Great Britain Application Serial No. 0807777.8, filed Apr. 29, 2008, and Great Britain Patent Application Serial No. 0810297.2, filed Jun. 6, 2008...--.

In Column 1, line 44 of the SUMMARY, the phrase "...a source of nitrogen..." should read --...a source of nitrogen,...--.

In the Claims

In Column 16, lines 17-18, claim 12, the phrase "...in which the curing of the binder is carried out by between platens of a press." should read --...in which the curing of the binder is carried out between platens of a press.--.

This certificate supersedes the Certificate of Correction issued November 26, 2013.

Signed and Sealed this
Fourth Day of February, 2014

Michelle K. Lee
*Deputy Director of the United States Patent and Trademark Office*